United States Patent

[11] 3,613,057

[72] Inventor Galina Ivanovna Dmitrakova
Zvezdny Bulvar 22, kv. 63, Moscow,
U.S.S.R.

[21] Appl. No. 854,192
[22] Filed Aug. 29, 1969
[45] Patented Oct. 12, 1971

[54] MAGNETIC ELEMENT PARTICULARLY FOR PERFORMING LOGICAL FUNCTIONS
3 Claims, 1 Drawing Fig.

[52] U.S. Cl. .......... 340/174 R, 340/174 PC, 340/174 HB, 307/88 LC
[51] Int. Cl. .......... G11c 7/00, G11c 11/06
[50] Field of Search .......... 340/174; 307/88

[56] References Cited
UNITED STATES PATENTS

| | | | |
|---|---|---|---|
| 2,695,993 | 11/1954 | Haynes | 340/174 |
| 2,774,957 | 12/1956 | Bonn | 340/174 |
| 2,935,738 | 5/1960 | Richards | 340/174 |
| 2,979,698 | 4/1961 | Bonn et al. | 340/174 |
| 3,130,321 | 4/1964 | Maley et al. | 307/88 |
| 3,432,821 | 3/1969 | Harklau et al. | 340/174 |

*Primary Examiner*—Stanley M. Urynowicz, Jr.
*Attorney*—Waters, Roditi, Schwartz & Nissen

ABSTRACT: A magnetic logical element, particularly, for performing logical operations, comprising cores having wound thereabout input windings, output windings and readout windings, each one of the cores having at least one additional winding wound thereabout and connected to the output windings similarly to the readout windings, this additional winding making up together with said readout windings an additional input, with one of the input signals being supplied to this additional input during each one of the successive readout cycles.

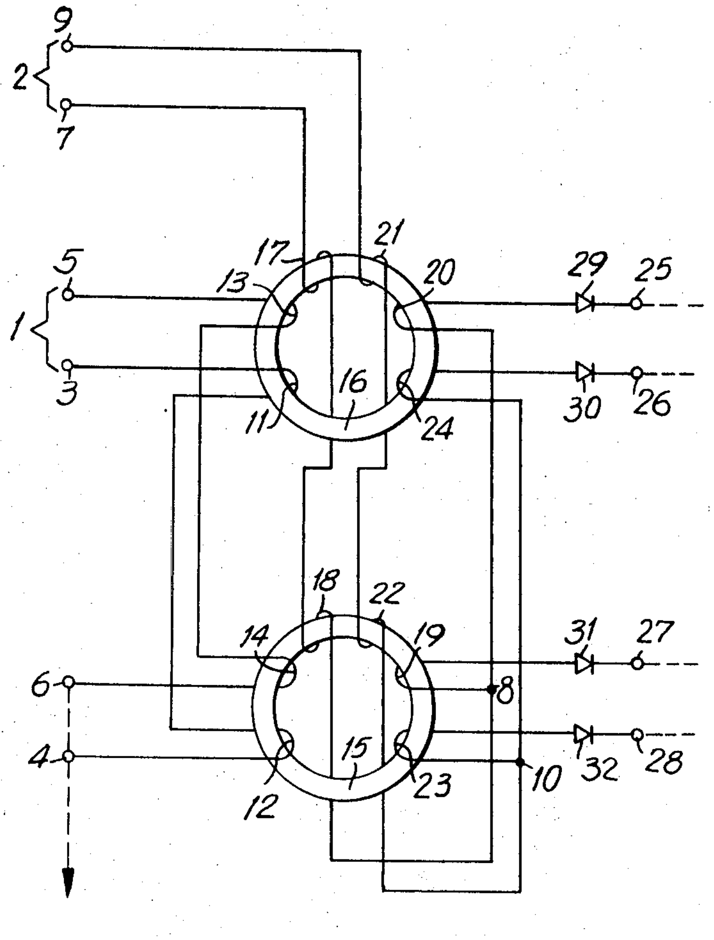
9
2
7
17
21
5
13
20
29
25
1
16
3
30
26
11
24
18
22
31
27
14
19
6
8
4
15
32
28
23
10
12

MAGNETIC ELEMENT PARTICULARLY FOR PERFORMING LOGICAL FUNCTIONS

The present invention relates to data processing and automatic control apparatus and can be used at the construction of various logical and switching apparatus.

A magnetic logical element with two inputs is known, which provides all the possible logical functions of two variables (see USSR Inventor's Certificate No. 185,582; Class 42 *m*, 14/03) the element operating according to the principle of controlling the "stepping" current pulses and including four ferromagnetic cores and four diodes. Information is recorded at the inputs of this known element by a current pulse being supplied to either one of the two input lines thereof, the information thus recorded depending on whether a "O" signal or a "1" signal is supplied to the respective input. The operation of this element is a double-cycle one. During one of each two successive cycles information is recorded at both inputs of this element, and during the other cycle this information is read out, whereby a "stepping" current pulse flows through one of the four output lines of the element, in strict accordance with the binary information appearing at the inputs thereof. In order to effect any one of the 16 logical functions of two variables, it is sufficient to connect the four output terminals in a corresponding combination or pattern to the input of a load circuit.

However, the known element suffers from a number of disadvantages. Its circuitry is comparatively complicated, due to its inclusion of four cores with their windings; it is inadequately economical because two ferrite or ferromagnetic cores should periodically change their magnetic state. Besides, with this known magnetic logical element the outcome of any logical function is effected at the output of the element no earlier than one half cycle after the information has been supplied to both inputs of the element. The last-mentioned feature leads to certain complications, when parallel devices are formed where carryover of information is to be performed without any cyclical delay.

It is an object of the present invention to overcome these disadvantages.

The present invention provides a simple and economical magnetic element, particularly, for performing logical operations, which will provide, at the output thereof, any one of the possible logical functions of two variables. This is attained in a magnetic logical element, comprising cores made of a material having a rectangular hysteresis loop of magnetization, each one of said cores having wound thereabout input windings, readout windings and output windings, said output windings being connected to the output terminals of said element through diodes, similar ones of said windings of said cores being connected in series, which element, in accordance with the present invention, further comprises at least one additional winding wound about each one of said cores, said additional windings of all of said cores being connected in series, forming together with said readout windings an additional input of said element, one input signal being supplied to said additional input during each successive readout cycle, said output windings being connected in parallel to the circuit formed by said additional windings.

The present invention will be better understood from the following detailed description of a preferred embodiment thereof, with due reference being had to the accompanying drawing, showing the circuit diagram of a magnetic element embodying the invention.

Referring now to the appended drawing, a magnetic element, embodying the present invention, includes a pair of toroidal ferromagnetic bodies, each constituting a separate magnetic core and being characterized by a rectangular hysteresis loop of magnetization. Alternatively, a magnetic element, embodying the present invention, may incorporate a pair of core members forming together a single magnetic core having a pair of openings therein.

The present circuit, incorporating a magnetic element, embodying this invention, has two inputs 1 and 2. Each one of the two inputs is associated, respectively, with a pair of electrical input lines: 3—4, 5—6 and 7—8, 9—10. One of the input lines of each pair is adapted to be supplied with an input signal (representing a desired binary-coded information).

Each one of the input lines 3—4 and 5—6 of the input 1 includes a respective pair of oppositely wound, serially connected windings: 11 and 12; 13 and 14, positioned respectively, about the cores 15 and 16. The windings 12 and 13 are used in their respective lines for recording information, i.e. for controlling the magnetic state of their respective cores, while each one of the windings 11 and 14 is used for responding to the magnetic state of the other one of the two magnetic cores, respectively.

The input 2 is associated with a pair of additional windings 17 and 18 positioned, respectively, about the two magnetic cores 15 and 16. These two last-mentioned windings are wound in opposition to the respective input windings 13 and 12; they are connected in series with each other and form one of the input lines (namely, 7—8) of the input 2. The end portion of the last-mentioned line is connected with a pair of output windings 19 and 20, wound, respectively, about the cores 15 and 16 in the same direction, as the additional windings 17 and 18. The readout windings 21 and 22 constitute the second line of the input 2, the two windings being wound, respectively, about the cores 15 and 16 in the same direction, as the additional windings 17 and 18. The end portion of the last-mentioned line is connected to a pair of output windings 23 and 24, disposed, respectively, about the cores 15 and 16, in a way, similar to that described above in connection with the output windings 19 and 20. The opposite ends of the output windings 20, 24, 19 and 23 are connected, respectively, to the output terminals 25, 26, 27 and 28 through the respective diodes 29, 30, 31 and 32. Thus, four output lines are formed, which are adapted to receive control or "stepping" current pulses and, therefore, to transmit corresponding information.

It is already clear that the herein-disclosed magnetic element includes half as many cores as the known one.

The herein-disclosed magnetic element makes it possible to send output signals representative of the all 16 logical functions of two variables, without need to introduce any changes into the circuit of the element itself. When any of these functions of two variables is to be established, it is sufficient to connect the four output terminals of the herein disclosed element in the corresponding pattern to the input of a load circuit. In this respect the herein-disclosed magnetic element is an all-purpose logical element.

The operation of the herein-disclosed element is based on the principle of controlling successive "stepping" current pulses.

The herein-disclosed element operates, as follows.

Let us presume that the input 1 is a "recording" input, and the input 2 is an information "transmitting" (or "stepping") input. The element operates according to a two half-cycle principle, i.e. information is supplied to the "recording" input 1 and the "transmitting" input 2 in alternating cycles. After an output signal has been sent to the load circuit, i.e. before the successive binary information is supplied to the "recording" input 1, both cores 15 and 16 are always in the same magnetic state the residual inductance is assumed to equal $-B_r$ ). During a corresponding cycle an information signal is supplied to the "recording" input 1 in the form of a current pulse supplied to either one of the two input lines 3—4 and 5—6, which corresponds to either a "1" binary code or a "O" binary code being sent to the input 1 of the element. Consequently, one of the two cores 15 and 16 changes its magnetic state to the residual inductance $+B_r$, while the other one of the cores maintains its initial state $-B_r$. Depending on the binary information received, either one of the cores 15 and 16 may change its state.

It is now assumed that a "O" is recorded by a current pulse being supplied to the input 1 through the line 3—4. This means that the core 15 changes its magnetic state from the $-B_r$ residual inductance to the $+B_r$ residual inductance, while the core 16 maintains its previous $-B_r$ state. Correspondingly, when a "1" is to be recorded, the input pulse is sent along the line 5—6. Now core 16 changes its state to the $+B_r$ residual inductance, while the core 15 maintains the initial $-B_r$ state. Unlike the known magnetic element, where recording is performed simultaneously at both inputs of the element by the current of a single-cycle pulse, in the herein-disclosed element information is supplied to the input 2, displaced by half a period, in respect to the input 1, i.e. during the next successive cycle, when readout takes place in the case of the known element. Thus, the output signal is presented simultaneously with the appearance of information at the input 2. Consequently, the operational speed of the magnetic element is increased, making it possible to effect rapid carryover in parallel-action apparatus.

Let us also presume that a current pulse passing through the line 7—8 corresponds to a "O" received at the input 2, while a current pulse passing through the line 9—10 corresponds to a "1" being received.

When current passes through either one of the two lines of the input 2, both cores 15 and 16 acquire the $-B_r$ state, which means that one of them has changed its previous state, and its output windings have induced thereacross an EMF directed, so as to cause either the diodes 29, 30 or the diodes 31, 32 to conduct. As a result, the output current may flow solely through the output winding of that one of the cores, which has not changed the state thereof.

It can easily understood that any one of the four possible combinations of binary information "OO," "O1," "10" and "11" at the inputs of the herein-disclosed element corresponds to a single one of the four output lines, through which a "stepping" current pulse may flow.

Let us again presume that a "O"0 is received at the input 1 of the element. This means that the current pulse comes through the line 3—4, changes the state of the core 15 to the $+_{B\ r}$ state and leaves the core 16 in the previous $-_{B\ r}$ state thereof. Now, if a "O" signal is recorded at the input 2 in the successive cycle of the same period, this means that the current pulse will flow through the line 7—8 and restore the core 15 to its initial $-_{B\ r}$ state without affecting the magnetic state of the core 16.

Thereafter the current may flow from the point 8 only by the output line 8—25 through the diode 29, the diode 31 of the other output line 8—27 having been closed by the voltage created across the output winding 19, on account of the core 15 having changed the magnetic state thereof. Thus, when a pair of "0's " is combined at the inputs of the element, the stepping current pulse will be presented at the output solely along the output line 8—25. This line is referred to as the "OO" line.

Now, let us presume that a "O" is again received at the input 1, i.e. the core 15 changes its magnetic state once more, and in the next successive cycle a "1" is received at the input 2. This time the current pulse will pass through the line 9—10, changing once again the state of the core 15, the diode 32 will be closed by the EMF across the winding 23, while the "-stepping" current pulse will flow through the output winding 24 of the cores 16 (which has not changed its magnetic state) and through the output line 10—26. This line we will call "01.".

Presuming now that a "1" is received at the input 1, i.e. the current pulse passes along the line 5—6 and changes the magnetic state of the core 16 to the $+_r$, and during the next successive cycle a "O" is received along the line 7—8. In this case the "stepping" current pulse will flow from the point 8 along the output line 8—27, the diode 29 in the line 8—25 being closed by the voltage produced across the winding 20, due to of the core 16 having changed its magnetic state. The last-mentioned line will be hereinbelow called "10."

And, finally, should "1'" be received at both inputs of the herein-disclosed element, the "stepping" current pulse wound flow along the line 10—28, which will be called "11."

Thus, it is now clear as certained that any combination of binary information at the inputs of the herein-disclosed element effects the sending of a "stepping" current pulse at the output of the element precisely through the respective one of the four output lines 8—25, 10—26, 8—27 and 10—28.

Consequently, in order to establish any one of the 16 possible logical functions of two variables, it is sufficient to connect the four output terminals of the herein-disclosed element to the input of a load circuit in the corresponding pattern.

Let us presume that we have to effect "disjunction" of two variables (an "OR" relationship). In this case the lines "01" (10—26), "1o" (8—27) and "11" (10—28) should be connected to that one of the input lines of the load circuit, which corresponds to receiving "1's, " while the line "OO" is to be connected to the "O" receiving input line of the load.

To effect "negative disjunction" ($\overline{\text{OR}}$) the output terminals should be connected to the load in an inverted order.

To effect "conjunction" the output line "11" (10—28) is connected to the "1" input line of the load, while the other three output lines "OO" (8—25), "01" (10—26) and "10" (8—27) are connected to the "O" input line thereof.

To effect "negative conjunction" ($\overline{\text{AND}}$), the output terminals are connected to the load in a pattern inverted in relation to the preceding one. To effect an equivalent logical relationship between the two variables, the lines "OO" (8—25) and "11" (10—28) of the herein-disclosed element are connected to the "1 " receiving input terminal of the load, while the lines "01" (10—26) and "10" thereof should be connected to the "O" recording terminals of the load.

This connection of the output terminals is inverted, when an inverse equivalent (exclusive OR) relationship is to be established.

When either a constant "O" or a constant "1" are to be transmitted, all the four output lines of the element should be connected, respectively, to the inputs of the load, adapted to receive either "0's" or "1's."

Those competent in the art will easily comprehend, in which way the rest of the 16 possible logical functions of two variables can be established.

The exceptionally wide logical abilities of the herein-disclosed element manifest themselves not only in its fitness to effect a variety of different logical functions, but also in its being capable of establishing at the output thereof several logical functions of the same variables simultaneously. It should be understood however, that when several logical functions are to be simultaneously supplied by the output of a single element, embodying the invention, the four output lines thereof should not be connected according to the logic of any one single function, and, therefore, when the resulting signals are to be received at the inputs of a load, the individual output lines of the herein-disclosed element should be separately connected for such recording. To attain this, it is sufficient to connect either one or two additional windings to the input of the load, whereby, instead of the output lines of the element being combined, they can be connected separately to the appropriate input terminals of each load member, according to the logic of the function required. Theoretically, all the 16 logical functions can be effected at the output of the herein-disclosed element simultaneously, but in practice the number of such functions is limited by the load capacity of the element. For example, an "AND" function and an "exclusive OR" function of the same pair of variables can be produced at the output of the herein-disclosed element simultaneously, and, consequently a single such element can be used as a half-adder.

Thanks to the wide logical capacity of the herein-disclosed element, as well as to the possibility of effecting simultaneously several different functions at the output of a single such element, it becomes attainable to reduce considerably the overall number of elements, needed for constructing complicated logical circuits.

The analysis of the operating principle of the herein-disclosed element has shown that when any single logical operation is performed, and even when several logical operations are performed simultaneously, the resulting signal is produced at the output of the element and is transmitted to a load circuit without any cycle delay, relatively to the appearance of the information at one of the inputs of the herein-disclosed element. This fact ensures a high swiftness of action of the element and provides for creating parallel-action systems, incorporating such elements, which will feature a rapid carryover of information, the outcome of such carryover being supplied to a rapid transmitting input.

As related to the moment of the information appearing at the input of the element, the recording of the result of the function being effected is delayed but by a single cycle, i.e. by one-half of the period of the operation of the element.

When the circuitry of the herein-disclosed element is considered, those competent in the art can easily comprehend that the element acts as a decoder with two inputs, i.e. a four-positional decoder. Thus, the element can be readily and profitably used for making up selection systems having a large number of positions to be selected.

It should be also stressed that the herein-disclosed principle of constructing a double-input magnetic logical element is quite applicable for elements with a greater number of inputs. A magnetic logical element with three inputs, constructed in accordance with the basic principle of the present invention, has eight input lines in which a "stepping" current pulse can be generated in response to the binary information supplied to the three inputs of the element. At the output of this last-mentioned element any one of the 256 logical functions of three variables can be effected.

It is a serious advantage of the present invention, that, in addition to its extremely simple structure and circuitry, the herein-disclosed element makes it possible to effect at the output thereof all the 16 logical functions of two variables, without a need to introduce practically any alterations into the internal structure of the element itself, merely by connecting correspondingly the output terminals thereof, when the element is linked to a load circuit.

Thus, the herein-disclosed element is a truly all-purpose one, and that in every meaning of this expression.

Moreover, the range of the logical abilities of the element is by no means limited by the provisions for effecting a variety of elementary logical functions. It is a serious asset of the herein-disclosed element, that it provides for effecting at the output thereof several different logical functions simultaneously.

Thanks to these advantages, the herein-disclosed element makes it possible to reduce considerably the overall amount of components in various structures and circuits incorporating such elements.

The herein-disclosed element is also characterized by an extremely quick response, on account of the outcome of any logical operation, and even of several logical operations, performed simultaneously, being generated at the output of the element without any cyclic delay in relation to the appearance of the information at one of the inputs thereof.

Due to that, the herein-disclosed magnetic element can be used for construction of parallel-action devices needing no separate switching circuits for rapid carryover.

The herein-disclosed element also features a relatively high economy, since every successive operation thereof is limited by to changing the magnetic state of merely one ferromagnetic core under the action of a minimal magnetic force for a given frequency.

What is claimed is:

1. A magnetic logical element comprising a plurality of cores having a substantially rectangular hysteresis loop of magnetization comprising a plurality of input windings, each of said cores having wound thereon a pair of said plurality of input windings with corresponding ones of said pairs of input windings being connected in series and wound in opposite directions on respective cores, a plurality of readout windings, each of said cores having wound thereon one of said readout windings, said readout windings being connected in series, a plurality of additional windings with one of said plurality of additional winding being wound on a respective core and being connected in series, a plurality of output windings, each of said cores having wound thereon a pair of said plurality of output windings with corresponding ones of said output windings being connected in series and forming two pairs of series-connected output windings, and wound in the same direction on respective cores, one end of one of said pair of said pair of series-connected output windings being connected to one end of said series-connected additional windings and one end of the other of said pair of said pair of series-connected output windings being connected to one end of said series-connected readout windings, and a plurality of diodes with one of said diodes connected to respective ones the other ends of said output windings.

2. A magnetic logical element as set forth in claim 1 wherein, one of said input windings is wound in one direction on one of said cores and said additional, readout, and output windings are wound in the opposite direction on said one core.

3. A magnetic logical element as set forth in claim 2, wherein one of said input windings wound on one of said cores responds to the magnetic state of another of said cores.